United States Patent Office 3,090,767
Patented May 21, 1963

3,090,767
DEVOLATILIZATION EXTRUSION METHOD FOR PREPARING A MONOVINYL AROMATIC RESIN-RUBBER BLEND
Joseph D. Colgan, Ozone Park, N.Y., and Harold E. Fife, Northford, Conn., assignors to American Cyanamid Company, New York, N.Y., a corporation of Maine
No Drawing. Filed Nov. 15, 1957, Ser. No. 696,601
17 Claims. (Cl. 260—45.5)

This invention relates to thermoplastic resinous compositions prepared from a hard resinous polymer and an elastic rubbery polymer. More particularly, this invention relates to a novel method for continuously blending a hard resinous polymer containing a major proportion of a monovinyl aromatic compound represented by the general formula

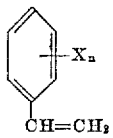

wherein X is a lower alkyl substituent having 1–4 carbon atoms and $n$ is an integer of from 0 to 2, with an elastic rubbery polymer. This invention also relates to improved compositions of this type and articles produced therefrom.

Polymers of styrene type compounds, e.g., polystyrene, polymethylstyrene and polydimethylstyrene including copolymers thereof with acrylonitrile and alphamethylstyrene are well known in the art. These compounds find many uses in the production of articles formed by compression molding, injection molding and the like. It is also well known that the mechanical properties of these compounds can be improved by incorporating therein a minor proportion of an elastic rubbery polymer. Various methods are employed to incorporate the rubbery polymer into the hard nonelastic styrene-type polymer. Among the known methods is that of mechanically working or masticating a mixture of the thermoplastic resin and elastomer on heated compounding rolls, the ingredients of the mixture thereby forming a homogeneous mass that is suitable for utilization as a molding compound. Another method which has been employed is the blending of solid resin and elastomer under heat and pressure in compounding mills such as Banbury mixers to blend the components of the mixture. Another procedure is to dissolve the elastomer in monomer of the type which forms the hard resin and polymerize. Another is to coagulate emulsion latices of the hard and rubbery polymers, thereby forming the resin-rubber composition. These prior methods, however, generally employ batch procedures which are time consuming and, by the time the mixture is sufficiently milled to effect homogeneous blending, the physical properties may be adversely affected. In other words, in using methods which employ mechanical working or milling of the resinous composition, there often results substantial molecular breakdown and weakening of the polymeric components by the time that the material is sufficiently worked to make the blend homogeneous.

It is an object of our invention to provide a novel continuous method for preparing a thermoplastic high impact resinous composition which comprises a blend of a monovinyl aromatic polymer and a rubbery elastomer. It is a further object of our invention to produce a homogeneous resinous composition, comprising a blend of a hard resinous polymer and a rubbery elastomer which may readily be molded by conventional operations to form articles having excellent appearance and superior mechanical properties. It is another object of the invention to provide a continuous method for making resinous compositions of the above type by a rapid procedure, which procedure provides excellent homogeneity of the product and permits good control over uniformity of the product. Other objects and advantages of our invention will become apparent as the description of the invention proceeds.

To facilitate the description of the invention, the hard resinous monovinyl aromatic polymer component of the blended composition will be referred to as component (A) and the rubbery elastomeric compound of the blend will be referred to as component (B).

The rubbery elastomer (B) employed in our invention may be any of the well known rubbery compounds either natural or synthetic, many of which are available commercially both in solid form or as latices. In general these elastomers comprise polymers and copolymers derived from diolefin compounds, such as butadiene-1,3; isoprene; 2,3-dimethylbutadiene-1,3; 1,4-dimethylbutadiene-1,3; piperylene; heptadiene-1,3; 2-methyl pentadiene-1,5; 2-methyl-3-butyl butadiene-1,3; 2,3-diethylbutadiene; and the like. The rubbery elastomeric compound (B) may consist entirely of a natural rubber or a synthetic rubbery diolefin, i.e. a homopolymer, although the diolefin rubbery polymer preferably contains a minor proportion, i.e. from about 5% to about 40% of an olefinic modifying compound, such as those of the general formula above, e.g. styrene, vinyl toluene, etc. or an acrylate or pyridine for example. The rubbery elastomers thus include such compounds as styrene-butadiene and butadiene-acrylonitrile rubbers, neoprene rubber, butyl rubber, silicone rubber, polyacrylate rubber, pyridine-butadiene rubbers and chlorosulfonated polyethylene, for example. The styrene-butadiene synthetic rubbers generally contain about 75% butadiene and about 25% styrene and the nitrile-butadiene rubbers about 15% to about 35% acrylonitrile, the remainder being butadiene. The composition of these rubbers, styrene-butadiene and acrylonitrile-butadiene, now referred to as SBR and NBR rubbers, respectively, (see ASTM designation: D1418–56T, June 1956), however, is not restricted to the above proportions. A highly desirable composition is obtained when the rubbery elastomer component (B) employed, either in solution or as a latex, is SBR type rubber, preferably containing styrene or methyl-styrene in amounts of from about 40% to about 95% by weight of butadiene with from about 60% to about 5% of styrene or methylstyrene.

The amount of the elastic rubbery component employed in our invention may vary widely; however, a preferred composition is obtained when a minor proportion, i.e. about 5 to about 45% by weight, based on the total weight of the composition, of the rubbery elastomer (B) either in solid form or as a latex, is employed.

The hard resinous thermoplastic polymer (A) contemplated by the present invention is prepared by homopolymerizing or copolymerizing in a major proportion a monovinyl aromatic monomer of the type represented by the general formula

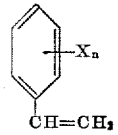

wherein X is a lower alkyl substituent and $n$ is an integer of from 0 to 2. Examples of such compounds are styrene per se, methylstyrene, including ortho-methylstyrene, meta-methylstyrene and para-methylstyrene, dimethylstyrene, ethylvinyl benzene, diethylvinyl benzene and the like or mixtures of any two or more of such compounds. Other polymerizable compounds of the type having the characteristic single $CH_2=C<$ group and which are substantially water-insoluble, such as acrylonitrile, methacrylonitrile, alpha-methylstyrene, methyl isopropenyl ketone, ethylacrylate, methyl methacrylate and the like may be copolymerized with compounds of the above type to form component (A) of the composition. When such comonomers are employed with the monovinyl aromatic compounds, they are used in amounts preferably not exceeding about 35%. Examples of suitable copolymers of the hard resinous component are styrene-acrylonitrile, methylstyrene - acrylonitrile, styrene - methacrylonitrile, methylstyrene - methacrylonitrile, methylstyrene - alphamethylstyrene, styrene-alphamethylstyrene, methylstyrene-methyl isopropenyl ketone, styrene-methyl isopropenyl ketone, methylstyrene-alphamethylstyrene-acrylonitrile and the like.

According to the novel process of the invention, the hard resinous polymer component (A) is employed in solution. The elastic rubbery component (B) is employed in a dispersed form either in solution or as a colloidal emulsion, such as a SBR latex. It will be apparent therefor that the term "rubber dispersion" includes a solution thereof, i.e. a dispersion of rubber in a solvent, as well as rubber in latex form. The solvent employed for each of the components, i.e. the hard resin and the rubbery elastomer may be any of the known solvents which are suitable therefor, such as toluene, xylene, etc. Preferably, the monomeric compound from which the major proportion of the hard resinous polymer component is derived is employed as the solvent for (A) and for (B), when (B) is used in solution as distinguished from latex. For example, if the resinous products are a blend of polymethylstyrene and styrene-butadiene type synthetic rubber, the solvent employed in making the solutions of polymethylstyrene and the styrene-butadiene rubber components to be blended is preferably methylstyrene monomer. The monomeric methyl-styrene removed from the blending may thereafter be recycled for further use. In an alternative manner, the SBR elastomer may also be employed in latex form, the proportion of rubbery solid in the dispersion comprising between about 30% and 60% of the emulsion. In this alternate procedure, the separation of the recovered monomer from the monomer-water volatiles presents no difficulty.

In preparing the solution of hard resinous polymer (A) to be used in practicing the invention, it is preferred that the solution contain not more than about 75% polymer in monomer and preferably at least 45% polymer. Amounts of polymer greater than 75% tend to result in difficulties in handling the material whereas monomer in excess of about 65% correspondingly minimize the economical advantage afforded by the technique by correspondingly prolonging the processing time required to effect removal of the unreacted monomer. It is apparent that the step of dissolving the polymer to form the solution of the hard resin component (A) may be avoided and such solution may be derived directly from the incomplete polymerization of the monomer of the general formula, such as by the method described in U.S. Patent No. 2,931,793 to J. A. Melchore. In this method, polymerization of the styrene-type monomer is stopped prior to complete conversion of monomer to polymer. According to the present invention not more than about 75% and it is preferred that not more than 70% polymer should be present in the solution of the hard resinous component and that the solution A of the hard resinous component be obtained through incomplete polymerization rather than by dissolving a substantially monomer-free solid polymer in a suitable solvent.

The present invention, however, may utilize a previously prepared solid polymer which is dissolved in a suitable solvent, preferably the corresponding monomer, to provide component solution (A).

According to the procedure of the invention, a stream of each of the components (A) and (B); A in solution and B either in solution or as a latex, is continuously fed in a form enabling accurate metering of these components in proportions to give the desired composition to a devolatilizer-extruder where the two streams are mixed, compounded, devolatilized and extruded in a period of less than 5 minutes. In the devolatilizer-extruder, the mixture is worked in a chamber under heat and vacuum so that the new surfaces of the polymer mixture are continuously and rapidly exposed to vacuum to remove the monomeric solvent (and water where rubber in latex form is employed) before extruding the product. In its preferred aspects the invention contemplates continuously feeding a stream of the rubbery elastomer in solution in monomer, or as a latex emulsion, in the desired proportion, with a stream of partially polymerized monovinyl aromatic compound obtained by incomplete polymerization of the monovinyl aromatic compound and subjecting the mixture to continuous compounding devolatilization and extrusion. The term devolatilization as herein employed refers to the step in which the nonpolymeric material is removed from the mixture of resin solution and rubber dispersion. The apparatus which simultaneously devolatilizes and extrudes the material is of a commercially available design and comprises a chamber with one or more screws having a close tolerance with the chamber wall for compounding the material in its passage therethrough, and at least one vacuum chamber for removing the volatile components of the feed. The action of working the material under the close tolerance of the screws not only intimately blends the mixture, but generates substantial heat which volatilizes the nonpolymer of the blend.

The devolatilizer-extruder may contain one or more interconnected sections, at least one being under vacuum. A preferred treatment wherein the material is worked for a total time of from 1 to 5 minutes, employs two vacuum sections. In addition to the vacuum sections, the devolatilizer-extruder may contain a section following the vacuum sections which is atmospheric, i.e. not under vacuum, wherein various volatile or nonvolatile modifiers, plasticizers or colorants, may be incorporated into the composition and extruded therewith.

The vacuum sections of the devolatilizer-extruder are heated from temperatures of about 110° C. to about 245° C. and maintained under vacuum at an absolute pressure of from about 5 to 200 mm. mercury. Preferably, the temperature of the sectionally heated devolatilizer-extruder is maintained at from about 160° C. to about 210° C. and the vacuum is preferably maintained at from about 5 to about 90 mm. mercury absolute pressure. As the two streams containing their liquid dispersing medium are introduced into the devolatilizer-extruder, the increased temperature causes volatilization of the nonpolymer from the two polymer components. At the same time, because the extruder is maintained at subatmospheric pressures, the volatile material is withdrawn or volatilized from the polymer-containing material. It is in this operation that the purity of the polymer is carried to greater than 98%. It should be noted that the present process does not involve polymerization of the two components, but rather concerns the removal of the volatile ingredients from the mixture employed in making the blend. In fact, the rapid passage of the blend through the devolatilizer-extruder in a period of less than five minutes is not conducive to any significant additional polymerization of polymerizable content present in the blend because of the rapidity of the step.

The treatment in the devolatilizer-extruder is highly advantageous in its rapidity in view of the fact that the removal of the solvent or suspending medium from the components is dependent upon the rate of diffusion from the polymeric material and this removal is ordinarily a very slow process, particularly with viscous styrene-type polymer masses having relatively large cross-sections. It is thus seen that the invention resides in a continuous process wherein a hard resinous monovinyl aromatic polymer in solution is combined with a rubbery polymer, in solution or as a latex, and the mixture is blended, compounded and extruded under the mechanical pressure of the screws of the extruder and under vacuum. In the devolatilizer-extruder, the nonpolymer contents of the mixture are thoroughly removed as the mixture is worked by the smearing heat generating mechanical action of the devolatilizer screw under vacuum. By this technique, the rate of diffusion is so improved that substantially 100% of the undesirable nonpolymer material is removed from the polymer thereby producing an excellent blend practically free of contaminants.

The total contact time of the material introduced into the devolatilizer-extruder to produce a material of greater than 98% and generally better than 99% polymer is less than about 5 minutes and ordinarily from about 0.5 to about 3 minutes. The relatively brief blending time is not only of itself advantageous, particularly in view of the fact that it is conducted continuously, but the rapidity of the processing time has also been found to greatly minimize the loss of the desirable properties from the blend, a disadvantage which commonly occurs when milling the mixtures by other methods. The accurate metering of the feed together with the short controllable blending time greatly facilitates the manufacture of an unusually uniform product.

The solvent which is removed by volatilization from the devolatilization-extrusion step, may be recycled to prepare subsequent elastomer feed solutions, or when the solvent is a monomeric compound, it may be employed in the polymerization to form the partially polymerized resin according to the preferred embodiment. When (B) is employed in latex form, water may be separated from the solvent used for (A) by conventional means. If, for example, methylstyrene monomer is employed as the solvent, the monomer can be separated from the water after condensing by decantation.

The following examples are set forth as illustrative of the continuous process of our invention for making a resinous composition by simultaneously blending, extruding and devolatilizing a charge comprising an elastomer and a hard resinous polymer. The results obtained in the examples set forth below are presented in Table I.

The specific enumeration of details should not be interpreted as a limitation, except as expressed in the appended claims. All parts are parts by weight unless otherwise stated.

DEVOLATILIZER-EXTRUDER—
GENERAL PROCEDURE

Methylstyrene monomer is charged continuously to a stainless steel kettle equipped with agitator and heating means. Heat is applied until a temperature of approximately 110° C. is obtained and the polymerizable material is reacted to approximately 40% polymer while maintained at a temperature of approximately 110° C. This 40% polymer–60% monomer solution is then fed continuously to a second reaction vessel wherein the material is maintained at approximately 110° C. and is reacted (polymerized) to approximately 65%. This 65% polymer–35% monomer solution is fed continuously to a counter rotating twin screw devolatilizer-extruder. Simultaneously with introduction of this feed, a solution of SBR rubber in methylstyrene monomer or an SBR latex is also metered into the feed hopper of the devolatilizer-extruder. In this extruder, the two solutions or the solution and latex are mixed, unreacted monomer and water in examples where a latex is employed are removed, and the polymethylstyrene and SBR are further mixed to form a homogeneous blend which is extruded through a multi-hole die and is cut into pellets of size suitable for use as a molding compound.

*Example 1*

1000 lbs. of methylstyrene is polymerized to 65% conversion (650 lbs. of polymethylstyrene and 350 lbs. of methylstyrene) and is fed to a twin screw devolatilizer-extruder. At the same time, 435 lbs. of a 20% solution of a commercial SBR (styrene-butadiene) rubber (having a combined ratio of 23 parts styrene-77 parts butadiene) in methylstyrene (87 lbs. SBR and 348 lbs. methylstyrene) is fed to the devolatilizer. The devolatilizer-extruder is maintained at 190° C. at the feed and extrusion end and at a temperature of approximately 240° C. and a vacuum of approximately 15 mm. in the central devolatilizer section. 737 lbs. of a molding compound (24.1% SBR and 75.9% polymethylstyrene) is continuously extruded from the devolatilizer. The retention time in the devolatilizer from the time the resin and elastomer are fed therein is 3 min.

*Example 2*

The procedure and conditions of Example 1 are repeated with the exception that 550 lbs. of 20% SBR (described in Example 1) solution is added to 1000 lbs. of 65% polymethylstyrene. The product yield is 760 lbs. containing 14.5% SBR and 84.5% polymethylstyrene.

*Example 3*

The procedure of Example 1 is repeated with the exception that 1000 lbs. of methylstyrene converted to a polymer content of 65%, and 572 lbs. of 25% solution of SBR (described in Example 1) in styrene is employed to give 793 lbs. of product containing 18% SBR and 82% polymethylstyrene.

*Example 4*

The procedure and conditions of Example 1 are repeated with the exception that 1020 lbs. of a 20% solution of SBR (described in Example 1) in methylstyrene is blended with 1000 lbs. of methylstyrene having a polymer content of 65%. The product yield is 854 lbs. containing 23.9% SBR and 76.1% polymethylstyrene.

*Example 5*

The procedure and conditions of Example 1 are employed with 1000 lbs. of methylstyrene converted to 65% and 1505 lbs. of 25% of SBR 1013 (57 parts butadiene–43 parts styrene) solution to give approximately 1026 lbs. of product containing approximately 36% SBR and 64% polymethylstyrene.

*Example 6*

Following the general procedure above, 1000 lbs. of methylstyrene is polymerized to 65% conversion (650 lbs. polymethylstyrene and 350 lbs. methylstyrene) and is fed to the devolatilizer. At the same time, 130 lbs. of SBR latex (FRS 2003 Latex containing 71 parts butadiene and 29 parts styrene) 60% solids content is fed to the devolatilizer. The devolatilizer-extruder is maintained at 185° C. at the feed end and at 250° C. and under a vacuum of 40 mm. in the central devolatilizer section. 728 lbs. of an impact strength molding compound (10.7% SBR and 89.3% polymethylstyrene) is extruded from the devolatilizer in 3.5 minutes after it is fed therein.

*Example 7*

The procedure of Example 6 is repeated with the exception that 1000 lbs. of styrene converted to a polymer content of 65% is blended with 198 lbs. of the SBR latex of Example 6 to give 768 lbs. of product containing 15.4% SBR and 84.6% polymethylstyrene.

*Example 8*

Example 6 is repeated with the exception that 245 lbs. of the SBR latex employed in Example 6 is blended with 1000 lbs. of methylstyrene having a polymer content of 65%. The product yield is 797 lbs. containing 18.4% SBR and 81.69% polymethylstyrene.

*Example 9*

Example 1 is repeated with the exception that 332 lbs. of the SBR latex employed in Example 6 is added to 1000 lbs. of 65% polymethylstyrene. The product yield is 849 lbs. containing 23.5% SBR and 76.5% polymethylstyrene.

*Example 10*

The procedure followed by Example 6 is repeated with the exception that 1000 lbs. of a comonomer mixture of methylstyrene-acrylonitrile in a weight ratio of 66:34 is polymerized in the presence of 0.1 part of tertiary dodecyl mercaptan until a 60% conversion and metered into the devolatilizer-extruder in place of the methylstyrene homopolymer. At the same time, 480 lbs. of a 50% solids NBR (butadiene-acrylonitrile) latex emulsion containing a butadiene acrylonitrile weight ratio of 65:35 is metered to the devolatilizer-extruder. The devolatilizer-extruder is maintained at 180° C. at the feed end and at 230° C. and under vacuum of 30 mm. in the central devolatilizer section. 870 lbs. of a high impact strength molding compound containing 28.6% NBR and 71.4% polymethylstyrene-acrylonitrile copolymer is extruded from the devolatilizer in 3.8 minutes after it is fed therein.

*Example 11*

The procedure of Example 1 employing the same proportions and conditions is repeated with the exception that methylstyrene is copolymerized in a 95:5 ratio with α-methylstyrene to a conversion of 65% prior to blending with the SBR elastomer.

*Example 12*

BLENDING IN BANBURY MIXER
(Comparative)

A commercial SBR solid rubber is charged to a Banbury mixer in solid form and polymethylstyrene is charged in pellet form. Following the end of the mixing cycle, i.e. the time required for a homogeneous product, the mixture is dropped into a single-screw extruder from which it is extruded through a multi-hole die to be cut into pellet form. The conditions for Example 12 employing a size 3A Banbury is as follows:

Rotor speed—70; ram pressure—60 p.s.i.; Banbury temperature—260° F.; mixing time—11 minutes; charge—110 lbs. of polymethylstyrene and 22 lbs. of SBR rubber; extrusion temperature—feed end 210° F., extrusion end 400° F.

*Example 13*

The procedure set forth for Example 1 is followed with the exception that a homopolymer of methylstyrene converted to a polymer content of 65% is passed through the devolatilizer-extruder without rubbery elastomer in a period of 3 minutes. The product in comparison to resin-rubber blends has a relatively low impact strength as seen by the results in Table I.

Suitable plasticizers and/or lubricants may be incorporated in the blend of monovinyl aromatic compound and rubbery elastomer by introducing these materials into the devolatilizer-extruder either at the feed end, when such additives are capable of withstanding the temperatures employed, or at an intermediate zone prior to extrusion of the blend. Any substantially nonvolatile organic compound which is a plasticizer or flow agent for the vinyl aromatic compound and is liquid over a temperature range of from 70° C. to 230° C. may be added for such purpose in preparing the resinous compositions. The additive should be soluble, or at least partly soluble in the polymerized monovinyl aromatic hydrocarbon and the rubbery elastomer components of the composition and should have a boiling point above 200° C. Organic compounds such as stearic acid, zinc stearate, nor.-butyl stearate, dibutylphthalate, dioctyldiphenyl ether and the like may be used. Other suitable materials include mineral and vegetable oils such as soybean or castor oil, natural and synthetic hydrocarbons, e.g. diisopropylbenzene, triethylbenzene, diisopropyltoluene, nor.-dodecane, diarylethanes, such as 1,1-ditolylethane and the liquid polymers of unsaturated alkenyl aromatic hydrocarbons such as the liquid dimers and trimers of alpha-methylstyrene or para-methyl-alphamethylstyrene. Such additives are generally employed in amounts of from about 0.1 to 5 percent by weight of the composition.

We claim:

1. A method for homogeneously blending (A) a nonrubbery resinous polymer of a monovinyl aromatic compound having the formula:

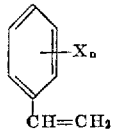

wherein X is a lower alkyl substituent of 1–4 carbon atoms and $n$ is an integer of from 0 to 2, and (B) a different polymer selected from the group consisting of natural rubber and organic synthetic rubbers artifically produced and having properties to some extent similar to natural rubber to form a high impact thermoplastic resinous blend, which comprises mixing a solution of (A), in a volatile solvent and having not more than 75% by weight of polymer (A), and a liquid dispersion of (B) and devolatilizing and extruding said mixture thereby simultaneously blending and volatilizing the nonpolymeric content from said mixture, at a temperature of between about 110° C. and about 245° C. and at an absolute pressure of less than 200 millimeters of mercury in a period of less than about 5 minutes.

TABLE I

| Example Number | Method | Blending time, minutes | Composition | Rubber content, percent | D-256,[1] Izod Impact, ft. lb. per in. of notch | D-790,[1] flexural strength, p.s.i. | D-638,[1] tensile strength, p.s.i. | D-648,[1,2] heat distortion temp., °C. | Boil test,[3] inches |
|---|---|---|---|---|---|---|---|---|---|
| 1 | Devol.-extruder | 1-5 | 20% soln. SBR in MESTY | 11.8 | 0.78 | 10,400 | 8,000 | 93 |  |
| 2 | do | 1-5 | do | 14.3 | 0.93 | 9,000 | 8,000 | 92 | 0.075 |
| 3 | do | 1-5 | 25% soln. SBR in MESTY | 18.0 | 1.3 | 8,600 | 7,000 | 93 | 0.115 |
| 4 | do | 1-5 | 20% soln. SBR in MESTY | 23.9 | 1.8 | 7,200 | 5,400 | 91 | 0.080 |
| 5 | do | 1-5 | do | 31.7 | 4.8 | 6,600 | 5,100 | 87 | 0.172 |
| 6 | do | 1-5 | SBR Latex | 10.7 | 0.88 | 11,300 | 8,200 | 93 | 0.064 |
| 7 | do | 1-5 | do | 15.5 | 1.3 | 11,000 | 7,500 | 98 | 0.054 |
| 8 | do | 1-5 | do | 18.6 | 2.6 | 9,400 | 6,400 |  | 0.058 |
| 9 | do | 1-5 | do | 23.0 | 2.9 | 8,600 | 6,300 |  | 0.066 |
| 10 | do | 1-5 | NBR Latex | 28.6 | 2.4 | 9,700 | 8,100 | 97 | 0.078 |
| 11 | do | 1-5 | 20% soln. SBR in MESTY-α-MESTY | 11.8 | 0.97 | 10,700 | 7,900 | 99 | 0.045 |
| 12 | Dry blend of resin and elastomer in Banbury mixer. | 11 | SBR | 16.7 | 0.92 | 7,600 | 6,100 | 90 | 0.300 |
| 13 | Devol.-extruder | 3 | Polymethylstyrene | 0 | 0.35 | 14,000 | 8,000 | 101 | 0.040 |

[1] ASTM Test No.
[2] At 264 p.s.i.
[3] Distortion in 100° C. water after 15 min. at 264 p.s.i.
All physical property measurements made on ½" x ¼" x 5" injection molded specimens.

2. The method of claim 1 wherein the monovinyl aromatic compound of (A) is methylstyrene.

3. The method of claim 1 wherein the monovinyl aromatic compound of (A) is styrene.

4. A method for homogeneously blending (A) a non-rubbery resinous polymer which comprises a major proportion of a monovinyl aromatic compound having the formula:

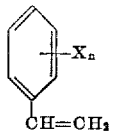

wherein X is a lower alkyl substituent of 1–4 carbon atoms and $n$ is an integer of from 0 to 2, and a minor proportion of a substantially water-insoluble compound having a single polymerizable $CH_2=C<$ group and (B) a different polymer selected from the group consisting of natural rubber and organic synthetic rubbers artificially produced and having properties to some extent similar to natural rubber to form a high impact thermoplastic resinous composition, which comprises mixing a solution of (A), in a volatile solvent and having not more than 75% by weight of polymer (A), and a liquid dispersion of (B) and devolatilizing and extruding said mixture thereby simultaneously blending and volatilizing the nonpolymeric content from said mixture, at a temperature of between about 110° C. and about 245° C. and at an absolute pressure of less than 200 millimeters of mercury in a period of less than about 5 minutes.

5. A method for homogeneously blending (A) a non-rubbery resinous polymer which comprises a major proportion of a monovinyl aromatic compound having the formula:

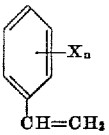

wherein X is a lower alkyl substituent of 1–4 carbon atoms and $n$ is an integer of from 0 to 2, and a minor proportion of a substantially water-insoluble compound having a single polymerizable $CH_2=C<$ group and (B) a different polymer selected from the group consisting of natural rubber and organic synthetic rubbers artificially produced and having properties to some extent similar to natural rubber to form a high impact thermoplastic resinous composition, which comprises mixing a solution containing not more than 75% by weight of polymer (A), and a solution of (B) wherein the liquid monomer of the general formula from which the resinous polymer (A) is derived is employed as a solvent for (A) and for (B), and devolatilizing and extruding said mixture thereby simultaneously blending and volatilizing the monomeric solvent therefrom at a temperature of between about 110° C. and about 245° C. and at an absolute pressure of less than 200 millimeters of mercury in a period of less than about 5 minutes.

6. A method for homogeneously blending (A) a non-rubbery resinous polymer in monomer wherein the polymer to monomer conversion is not greater than 75% by weight and which polymer comprises a major proportion of a monovinyl aromatic compound having the formula:

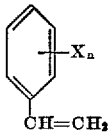

wherein X is a lower alkyl substituent of 1–4 carbon atoms and $n$ is an integer of from 0 to 2 and a minor proportion of a substantially water-insoluble compound having a single polymerizable $CH_2=C<$ group and (B) a different polymer selected from the group consisting of natural rubber and organic synthetic rubbers artificially produced and having properties to some extent similar to natural rubber to form a high impact thermoplastic resinous composition which comprises mixing a solution of (A) in a volatile solvent and a solution of (B), wherein the monomer of the general formula from which the resinous polymer (A) is derived is employed as solvent for (B), and devolatilizing and extruding said mixture thereby simultaneously blending and volatilizing the monomeric material therefrom at a temperature of between about 100° C. and about 245° C. and an absolute pressure of less than 200 millimeters of mercury in a period of less than about 5 minutes.

7. The method of claim 6 wherein (A) is a homopolymer of methylstyrene and (B) is a butadiene-styrene copolymer.

8. The method of claim 6 wherein (A) is a copolymer of methylstyrene-α-methylstyrene and (B) is a butadiene-styrene copolymer.

9. The method of claim 6 wherein (A) is a copolymer of methylstyrene-acrylonitrile and (B) is a butadiene-acrylonitrile copolymer.

10. The method of claim 6 wherein (A) is a homopolymer of styrene and (B) is a butadiene-styrene copolymer.

11. A continuous method for making a homogeneous blend of polymethylstyrene and a butadiene-styrene copolymer which comprises mixing a solution of polymethylstyrene dissolved in methylstyrene monomer wherein the polymer to monomer ratio is not greater than 70% by weight and a solution comprising a butadiene and styrene copolymer dissolved in methylstyrene, and devolatilizing and extruding the mixture at a temperature of from about 110° C. and about 245° C. and at an absolute pressure of less than 200 millimeters of mercury in a period of between 1 and 3 minutes.

12. The method of claim 11 wherein the polymethylstyrene solution comprises partially polymerized methylstyrene wherein the conversion to polymer is less than 70% by weight.

13. A continuous method for making a homogeneous blend of polymethylstyrene and a butadiene-styrene copolymer which comprises mixing a solution of polymethylstyrene dissolved in methylstyrene monomer wherein the polymer to monomer ratio is not greater than 70% and a butadiene-styrene latex and devolatilizing and extruding the mixture at a temperature between about 110° C. and about 245° C. and at an absolute pressure of less than 200 millimeters of mercury in a period of between 1 and 3 minutes.

14. The method of claim 13 wherein the polymethylstyrene solution comprises partially polymerized methylstyrene, wherein the conversion to polymer is less than 70%.

15. The method of claim 12 wherein the respective solutions are fed in a ratio to provide a final composition containing from about 65% to 95% by weight polymethylstyrene and from about 35% to 5% by weight styrene-butadiene copolymer.

16. The method of claim 14 wherein the respective polymer components of the mixture are fed in a ratio to provide a final composition containing from about 65% to 95% by weight polymethylstyrene and from about 35% to 5% by weight styrenebutadiene copolymer.

17. The method of claim 1 which comprises premixing and preheating said solution and dispersion, respectively, of (A) and (B) prior to subjecting the mixture to devolatilization and extrusion.

References Cited in the file of this patent

UNITED STATES PATENTS

| | | |
|---|---|---|
| Re. 23,948 | Fuller | Feb. 15, 1955 |
| 2,574,439 | Seymour | Nov. 6, 1951 |
| 2,808,386 | D'Alelio | Oct. 1, 1957 |

UNITED STATES PATENT OFFICE
CERTIFICATE OF CORRECTION

Patent No. 3,090,767                                              May 21, 1963

Joseph D. Colgan et al.

It is hereby certified that error appears in the above numbered patent requiring correction and that the said Letters Patent should read as corrected below.

Column 10, line 13, for "100° C." read -- 110° C. --.

Signed and sealed this 26th day of November 1963.

(SEAL)
Attest:
ERNEST W. SWIDER

EDWIN L. REYNOLDS

Attesting Officer                          Acting Commissioner of Patents